United States Patent
Tanaka

(10) Patent No.: US 7,604,421 B2
(45) Date of Patent: Oct. 20, 2009

(54) IMAGING DEVICE MODULE

(75) Inventor: Hitoshi Tanaka, Saitama (JP)

(73) Assignee: Hoya Corporation, Tokyo (JP)

( * ) Notice: Subject to any disclaimer, the term of this patent is extended or adjusted under 35 U.S.C. 154(b) by 302 days.

(21) Appl. No.: 11/459,189

(22) Filed: Jul. 21, 2006

(65) Prior Publication Data
US 2007/0019950 A1  Jan. 25, 2007

(30) Foreign Application Priority Data
Jul. 25, 2005  (JP) .............................. 2005-214990

(51) Int. Cl.
*G03B 9/08* (2006.01)
*G03B 17/00* (2006.01)
(52) U.S. Cl. ...................... 396/462; 396/542
(58) Field of Classification Search ................ 396/462, 396/529, 542, 535; 359/695, 819
See application file for complete search history.

(56) References Cited

U.S. PATENT DOCUMENTS

| | | | |
|---|---|---|---|
| 5,581,412 A | 12/1996 | Tanaka | |
| 5,784,206 A * | 7/1998 | Nomura et al. | 359/698 |
| 6,493,511 B2 | 12/2002 | Sato | |
| 6,661,970 B2 * | 12/2003 | Nomura et al. | 396/79 |
| 2002/0041764 A1 * | 4/2002 | Tanaka | 396/535 |
| 2005/0237426 A1 * | 10/2005 | Takashima et al. | 348/375 |
| 2005/0254815 A1 * | 11/2005 | Sakamoto | 396/462 |

FOREIGN PATENT DOCUMENTS

| | | |
|---|---|---|
| JP | 2002-262164 | 9/2002 |
| JP | 2004-334101 | 11/2004 |

OTHER PUBLICATIONS

English Language Abstract of JP 2002-262164.

* cited by examiner

*Primary Examiner*—W B Perkey
*Assistant Examiner*—Minh Q Phan
(74) *Attorney, Agent, or Firm*—Greenblum & Bernstein, P.L.C.

(57) ABSTRACT

An imaging device module includes a housing; and a lens system, an image pickup device, a shutter unit, an external circuit board and a flexible printed wiring board which are provided with the housing. The shutter unit is movable in an optical axis direction. The external circuit board is provided outside of the housing. The flexible printed wiring board, one and the other ends of which are electrically connected to the shutter unit and the external circuit board, respectively, is curved so as to intersect a plane including the optical axis at a position one of in front of and behind the shutter unit, so that the one and the other ends of the flexible printed wiring board are positioned on opposite sides of the plane.

15 Claims, 7 Drawing Sheets

IMAGING DEVICE MODULE

BACKGROUND OF THE INVENTION

1. Field of the Invention

The present invention relates to an imaging device module which includes a lens and an image pickup device and which is used for taking digital images in an imaging device such as a digital camera or a camera integrated into a cellular phone, and more specifically, relates to an imaging device module which can be provided with functions such as a zooming function for varying the focal length of a lens system by moving one or more lens elements in an optical axis direction and an AF (autofocus) function for bringing an object into focus automatically by moving one or more lens elements in an optical axis direction.

2. Description of the Prior Art

Various imaging device modules configured to take digital images have been proposed. Such imaging device modules incorporate a lens system for optically forming an image of an object and an image pickup device such as a CCD image sensor for converting the object image formed through the lens system into an electrical signal. Additionally, in this type of imaging device module, specifically in the type of imaging device module having a zooming function for varying the focal length of a lens system and an AF (autofocus) function for bringing an object into focus automatically, one or more lens elements are moved in an optical axis direction; however, during this lens movement, a shutter unit also needs to be moved in the optical axis direction. Since the shutter unit is composed of a mechanical shutter which is opened and shut in accordance with electrical signals, the shutter unit is electrically connected to a circuit board via a flexible PWB (flexible printed wiring board) which is easily deformed in response to movements of the shutter unit.

For instance, although the lens barrel disclosed in Japanese unexamined patent publication 2004-334101 is related to retractable lens technology for a camera, this publication describes the same shutter unit technology as the above described shutter unit in that a shutter unit composed of a mechanical shutter is moved with a lens group in an optical axis direction, and adopts a structure using a flexible PWB which is connected to the shutter unit so that the wiring board which is connected to the shutter unit can follow movements of the shutter unit. Since a flexible PWB can be easily deformed in the direction of the thickness thereof, electrically connecting the shutter unit to a circuit board on a camera body via a flexible PWB makes it possible to maintain electrical connections between the shutter unit and the circuit board by flexible deformation of the flexible PWB even if shutter unit is moved in the optical axis direction.

In this type of lens barrel in which a shutter unit is electrically connected to a circuit board via a flexible PWB, the elastic deformation of the flexible PWB needs to be limited so that an elastically deformed portion of the flexible PWB does not enter an optical path of a lens system to intercept a light bundle of an object image when the flexible PWB is elastically deformed. To this end, in the above noted Japanese unexamined patent publication, the lens barrel is provided on one side thereof with a recessed portion in which such an elastically deformed portion can be accommodated. This elastically deformed portion is retracted into the recessed portion that is position off (away from) an optical path of the lens system to thereby prevent the elastically deformed portion from intercepting a light bundle of an object image when the flexible PWB is elastically deformed by a retracting movement of the lens barrel.

Since such a recessed portion is formed on an external wall of the lens barrel in the technique disclosed in the above noted Japanese unexamined patent publication, providing the recessed portion increases the outer diameter of the lens barrel, thus becoming an obstacle to miniaturization of the lens barrel. Specifically, there has been a demand for miniaturization of the imaging device module used for cameras produced in recent years such as digital cameras and cameras integrated into cellular phones, and accordingly, it is difficult to adopt the structure disclosed in the above noted Japanese unexamined patent publication that increases the outer diameter of the lens barrel. Additionally, since the flexible PWB is bent when elastically deformed in the lens barrel, the resistance to the flexible PWB increases at the elastically deformed portion and increases a load on movements of the shutter unit when moved in an optical axis direction, thus becoming an obstacle to miniaturization of a mechanism (including a drive motor) for moving the lens group and the shutter unit. Moreover, since the flexible PWB easily comes in contact with the inner wall of the lens barrel when elastically deformed, a frictional force produced at the contacting portion between the flexible PWB and the inner wall of the lens barrel further increases the load on movements of the shutter unit when moved in an optical axis direction.

SUMMARY OF THE INVENTION

The present invention provides a miniaturized imaging device module using a flexible PWB.

According to an aspect of the present invention, an imaging device module is provided, including a housing; and a lens system, an image pickup device, a shutter unit, an external circuit board and a flexible printed wiring board which are provided with the housing. The shutter unit is movable in an optical axis direction. The external circuit board is provided outside of the housing. The flexible printed wiring board, one and the other ends of which are electrically connected to the shutter unit and the external circuit board, respectively, is curved so as to intersect a plane including the optical axis at a position one of in front of and behind the shutter unit, so that the one and the other ends of the flexible printed wiring board are positioned on opposite sides of the plane.

It is desirable for the flexible printed wiring board to be in the shape of a strip.

It is desirable for the housing to include a photographing aperture frame provided on a wall of the housing to which the image pickup device is mounted. A portion of the photographing aperture frame, which faces the curved flexible printed wiring board, is recessed in a direction of thickness of the photographing aperture frame to have a thin wall thickness which is thinner than the thickness of the photographing aperture frame. An optical filter for the image pickup device is fixed to the photographing aperture frame via a mask frame.

It is desirable for the mask frame to include a bent portion which is formed so as to correspond to the recessed portion of the photographing aperture frame.

It is desirable for at least one opening to be formed on a side of the housing into which the flexible printed wiring board partly enters. At least one lid having a smoothed inner surface is fixed to the housing so as to cover the opening on an outer side of the housing.

It is desirable for the imaging device module to include at least one motor for driving the lens element, and for the housing to include a plastic housing portion molded out of resin and a metal housing portion, the motor being fixed to the metal housing portion.

It is desirable for two of the lens elements to be driven in the optical axis direction in the housing, and for two of the motors for driving the two lens elements in the optical axis direction, respectively, to be fixed to the metal housing portion to be arranged side by side.

It is desirable for the imaging device module to include a stationary seat member made of metal which is fixed to the plastic housing portion. The metal housing portion is fixed to the stationary seat member by at least one set screw.

It is desirable for the stationary seat member to be fixed to the plastic housing portion by at least one other set screw.

It is desirable for the imaging device module to include a plurality of parallel guide shafts provided in the housing for guiding the lens element and the shutter unit in the optical axis direction.

It is desirable for the portion of the photographing aperture frame to be recessed rearward, toward the image pickup device, to prevent the flexible printed wiring board from interfering with the photographing aperture frame.

The optical filter can be a low-pass filter.

It is desirable for the opening to be elongated in the optical axis direction.

It is desirable for the two lens elements to be driven in the optical axis direction to perform at least one of a zooming operation and a focusing operation.

In an embodiment, an imaging device module is provided, including a housing; a lens system, an image pickup device, and a shutter unit, which are accommodated in the housing; and a flexible printed wiring board which extends from the shutter unit so that an end portion of the flexible printed wiring board is connected to an external circuit board positioned outside of the housing. The lens system includes at least one lens element which is integrally moved with the shutter unit in an optical axis direction. The flexible printed wiring board extends from the shutter unit to the external circuit board so that a part of the flexible printed wiring board is curved so as to intersect a plane including the optical axis at a position one of in front of and behind the shutter unit.

According to the present invention, the strip-shaped flexible PWB is curved so as to intersect a plane including the optical axis at a position either in front of or behind the shutter unit, so that one and the other ends of the printed wiring board are positioned on opposite sides of this plane. Hence, the strip-shaped flexible PWB is gently curved at a substantially constant curvature, namely, no portion of the strip-shaped flexible PWB is folded (bent sharply). Therefore, only a small force is required to deform the flexible PWB, and accordingly, load on the motor (drive motor) for moving the shutter unit does not increase, which makes it possible to adopt a small-sized motor for the drive motor, thus lowering power consumption. The outer dimensions of the housing do not increase because a recessed portion like the above described recessed portion disclosed in Japanese unexamined patent publication 2004-334101, which makes it possible for the flexible PWB to be elastically deformed in the housing, does not need to be formed on a side of the housing. Moreover, even if the flexible PWB is curved outward to partly come in contact with an inner surface of the housing when the shutter unit moves, the flexible PWB can be elastically deformed smoothly while the circuit pattern printed on the flexible PWB is not damaged by friction, etc., because a lid having a smoothed (e.g., polished or glazed) inner surface is fixed to the inner surface of the housing. Furthermore, although the flexible PWB partly comes close to an inner surface of a rear end portion of the housing to which the image pickup device is mounted when the shutter unit moves reward, this rear end portion is formed to have a thin wall thickness so that the flexible PWB does not interfere with the inner surface of the rear end portion of the housing, which makes it easy for the flexible PWB to be elastically deformed. In this case, if an optical filter for the image pickup device is fixed to the housing using a mask frame, the optical filter can be fixed to the housing at a precise position with a required strength. Additionally, if a part of the housing is made of plastic and another part of the housing is made of metal, a reduction in weight of the whole housing can be achieved while maintaining a sufficient strength.

The present disclosure relates to subject matter contained in Japanese Patent Application No. 2005-214990 (filed on Jul. 25, 2005) which is expressly incorporated herein in its entirety.

BRIEF DESCRIPTION OF THE DRAWINGS

The present invention will be discussed below in detail with reference to the accompanying drawings, in which.

DESCRIPTION OF THE PREFERRED EMBODIMENT

Figure 1:
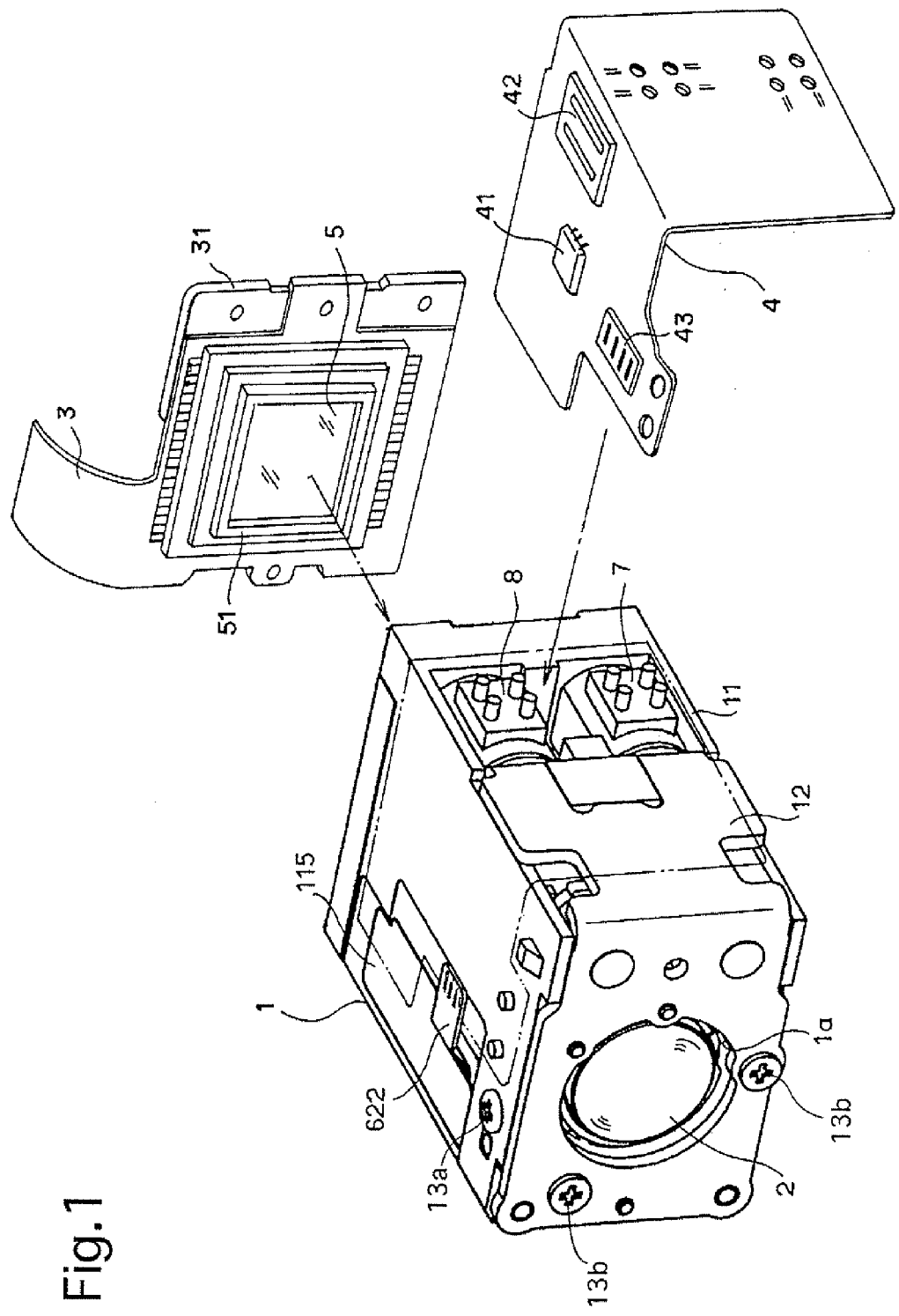
FIG. 1 is a perspective view of an embodiment of an imaging device module from which several parts thereof are removed for the purpose of illustration.

FIG. 1 shows an outer appearance of an embodiment of an imaging device module according to the present invention, from which several parts thereof are removed. The imaging device module is provided with a box-shaped housing 1. The housing 1 is provided in the front end wall thereof with a circular lens aperture 1a through which a lens system 2, provided in the housing 1 for formation of an object image, is exposed. The imaging device module is provided at the rear end thereof with an image pickup device 5 mounted on a first circuit board (flexible printed circuit board) 3 via which the image pickup device 5 is fixed to the rear end of the imaging device module. Electrical signals obtained by imaging an object image formed by the lens system 2 therethrough are output to the outside of the image pickup device 5 via the first circuit board 3. The imaging device module is provided with a second circuit board (flexible printed circuit board/external circuit board) 4 which is positioned to cover a specific outer surface area of the imaging device module which extends from the top face of the housing 1 to a side face of the housing 1 that is positioned on the right side as viewed in FIG. 1. The second circuit board 4 is provided thereon with an electrical circuit for making electrical connections to first and second drive motors 7 and 8 for driving the lens system 2 for zooming and focusing. Various electronic components 41 (only one of which is shown in FIG. 1) and connecting terminals 42 and 43 are mounted on the second circuit board 4.

Figure 2:
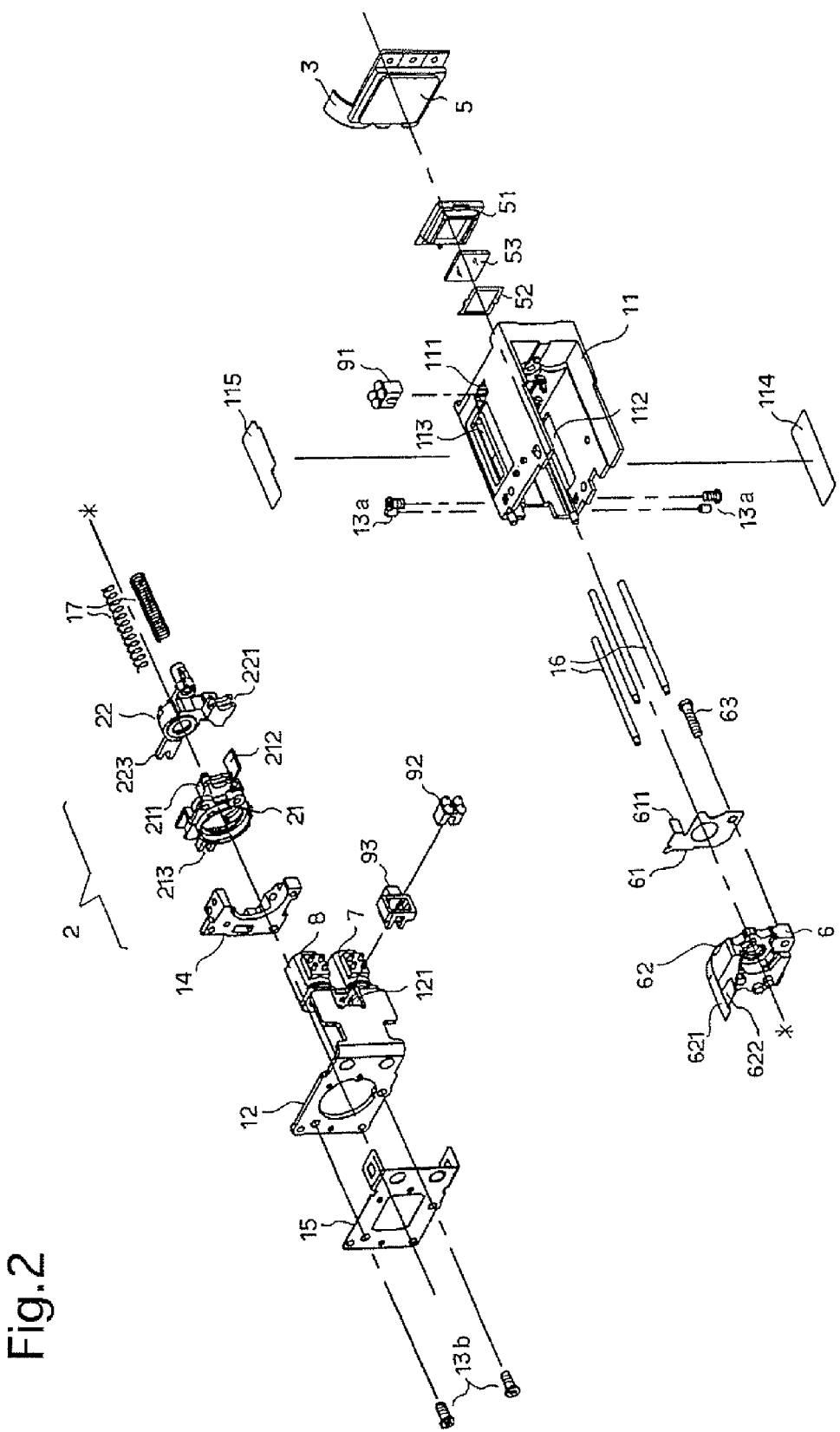
FIG. 2 is an exploded perspective view of the imaging device module shown in FIG. 1.
Figure 3:
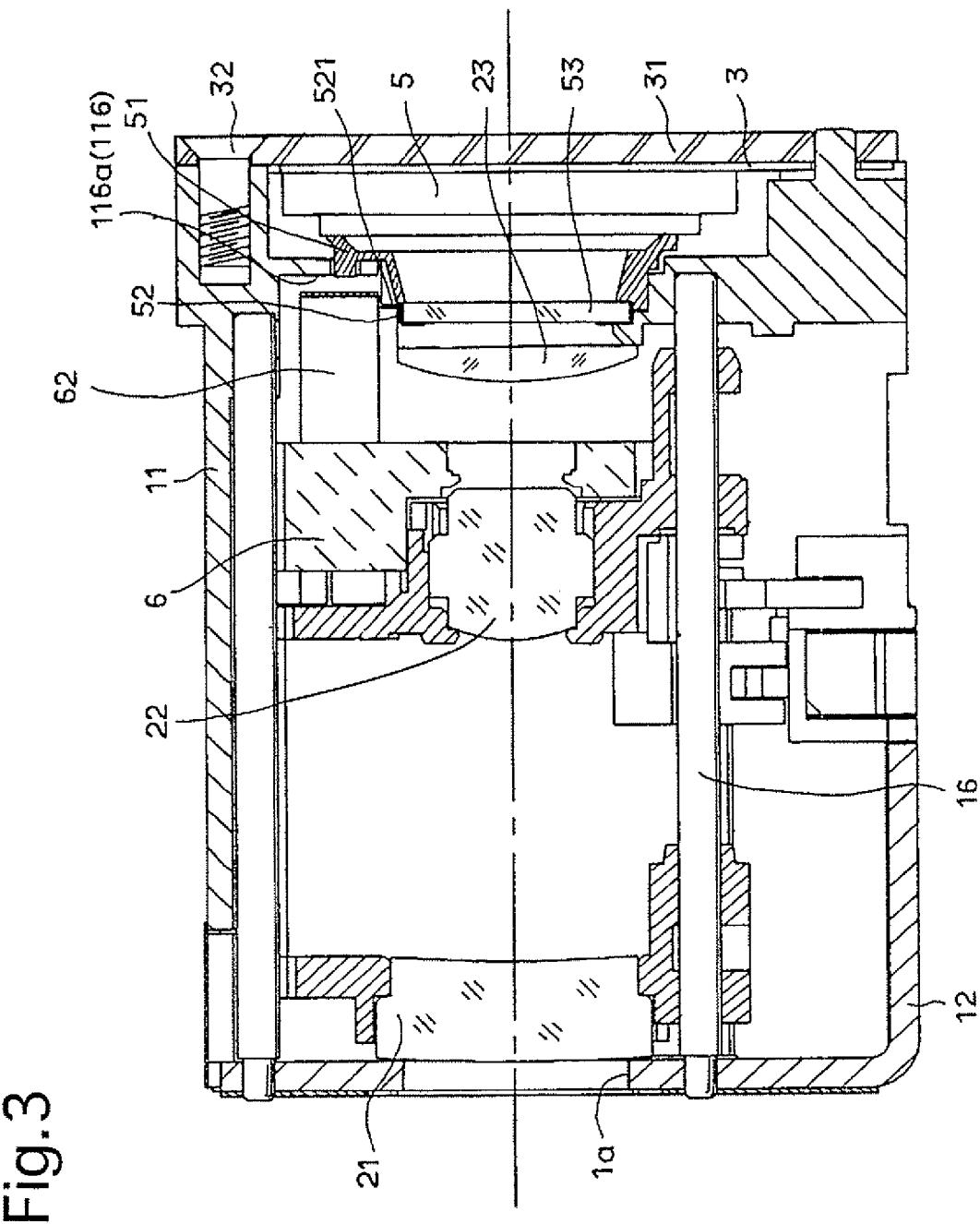
FIG. 3 is a cross sectional view of the imaging device module, taken horizontally along the optical axis of the lens system.

FIG. 2 is an exploded perspective view of the imaging device module and FIG. 3 is a cross sectional view of the imaging device module, taken horizontally along the optical axis of the lens system 2. The housing 1 is provided with a plastic housing portion 11 and a metal housing portion 12. The plastic housing portion 11 is molded out of resin. One end (front end) of the plastic housing portion 11 in the lengthwise direction and one side of the plastic housing portion 11 adjacent to the front end face are open so that the plastic housing portion 11 has a substantially U-shape in cross section. The metal housing portion 12 is bent to have an L-shape in cross section to close the front end opening and the side opening of the plastic housing portion 11. The circular lens aperture 1a is formed in the front end of the metal housing portion 12. The imaging device module is provided with a die-cast stationary seat member 14 having a substantially arc shape which is provided independently of each of the plastic housing portion 11 and the metal housing portion 12. The stationary seat member 14 can be made of metal such as an aluminum alloy by die-casting. The stationary seat member 14 is fixed to the front end of the plastic housing 11 by the set screws 13a which are screwed from the top and bottom of the housing 1, and the metal housing 12 is fixed to the stationary seat member 14 by the set screws 13b which are screwed from the front of the housing 1. In other words, the plastic housing portion 11 and the metal housing portion 12 are joined together by set screws 13a and 13b via the stationary seat member 14 to form the housing 1. Hence, this fixing structure using the stationary seat member 14 increases the strength of the joint by the set screws 13a and 13b between the plastic housing portion 11 and the metal housing portion 12. A filter frame 15 is mounted to the front of the metal housing 12 to be integral therewith when the metal housing portion 12 is fixed to the plastic housing 11 by the set screws 13b. The filter frame 15 is provided with a rectangular aperture to which an optical filter such as a protection filter or an infrared absorption filter is fixed.

The imaging device module is provided in the housing 1 with three guide shafts 16 which extend parallel to one another in the lengthwise direction of the housing 1, i.e., in the optical axis direction. The lens system 2 is provided with a first lens element 21 and a second lens element 22, the axes of which are aligned, and are supported by the three guide shafts 16 to be guided therealong in the optical axis direction. Although each of the first lens element 21 and the second lens element 22 is directly supported by an associated lens frame, the first lens element 21 and the lens frame thereof are collectively referred to as the first lens element 21 while the second lens element 22 and the lens frame thereof are collectively referred to as the second lens element 22. The first lens element 21 is provided (on the lens frame thereof) with three guide portions 213 which are supported on the three guide shafts 16 to be slidable thereon, respectively, and the second lens element 22 is provided (on the lens frame thereof) with three guide portions 223 which are supported on the three guide shafts 16 to be slidable thereon, respectively. The first lens element 21 and the second lens element 22 are biased forward in the optical axis direction by two compression coil springs 17 which are loosely fitted over two of the three guide shafts 16. The imaging device module is provided with a shutter unit 6 which is composed of an electrically controlled mechanical shutter. The shutter unit 6 together with an auxiliary plate 61 is integrally fixed to the second lens element 22 by a set screw 63 to be movable together with the second lens element 22. A flexible printed circuit board 62 is formed integral with the shutter unit 6. The flexible printed circuit board 62 will be discussed in detail later.

Figure 4:
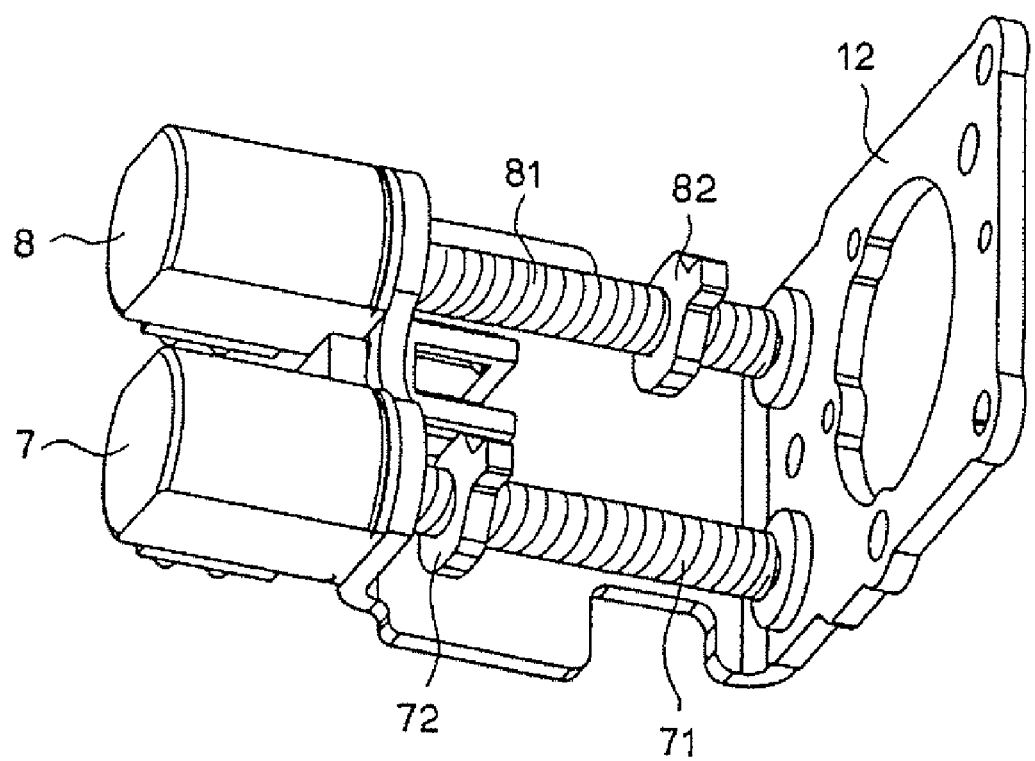
FIG. 4 is a perspective view of a metal housing portion to which two drive motors are mounted, viewed obliquely below from an inner side thereof.

The first and second drive motors 7 and 8, each of which is a stepping motor, are fixed to a side surface of the metal housing portion 12 to be arranged side by side. FIG. 4 is a perspective view of the metal housing portion 12 to which the first and second drive motors 7 and 8 are mounted, viewed from an inner side of the metal housing portion 12. Rotary output shafts of the first and second drive motors 7 and 8 extend in the optical axis direction and are threaded so as to serve as feed screws 71 and 81, respectively. The feed screws 71 and 81 are screwed into driven nuts 72 and 82, respectively, each of which is prevented from rotating so that the driven nuts 72 and 82 move along the feed screws 71 and 81 in the optical axis direction when the feed screws 71 and 81 are driven by the first and second drive motors 7 and 8, respectively. Engaging lugs 211 and 221 are formed integral with the first lens element 21 and the second lens element 22, respectively, and the driven nuts 72 and 82 are engaged with the engaging lugs 211 and 221 so as to respectively move integrally therewith in the optical axis direction. Due to this structure, moving the driven nuts 72 and 82 along the feed screws 71 and 81 by driving the first and second drive motors 7 and 8 causes the first lens element 21 and the second lens element 22 to move in the optical axis direction, respectively.

The plastic housing portion 11 is provided on top thereof with a rectangular opening 111 in which a photo-interrupter (photo-sensor) 91 is fixedly fitted and the metal housing portion 12 is provided on a side thereof with a rectangular opening 121 in which a photo-interrupter (photo-sensor) 92 is fixedly fitted. Specifically, the photo-interrupter 92 is fixedly fitted in the rectangular opening 121 of the metal housing portion 12 via a plastic holder 93. The first lens element 21 is provided with a detecting piece 212 which is integrally formed therewith. The photo-interrupter 92 that is supported by the metal housing portion 12 detects a specific position of the first lens element 21 in the optical axis direction when a light beam of the photo-interrupter 92 is blocked by the detecting piece 212 passing between opposing emitter/receiver elements of the photo-interrupter 92. Similarly, the auxiliary plate 61, which is integral with the second lens element 22, is provided with a detecting piece 611 which is integrally formed therewith. The photo-interrupter 91 that is supported by the plastic housing portion 11 detects a specific position of the second lens element 22 in the optical axis direction when a light beam of the photo-interrupter 91 is blocked by the detecting piece 611 passing between opposing emitter/receiver elements of the photo-interrupter 91.

Figure 5:
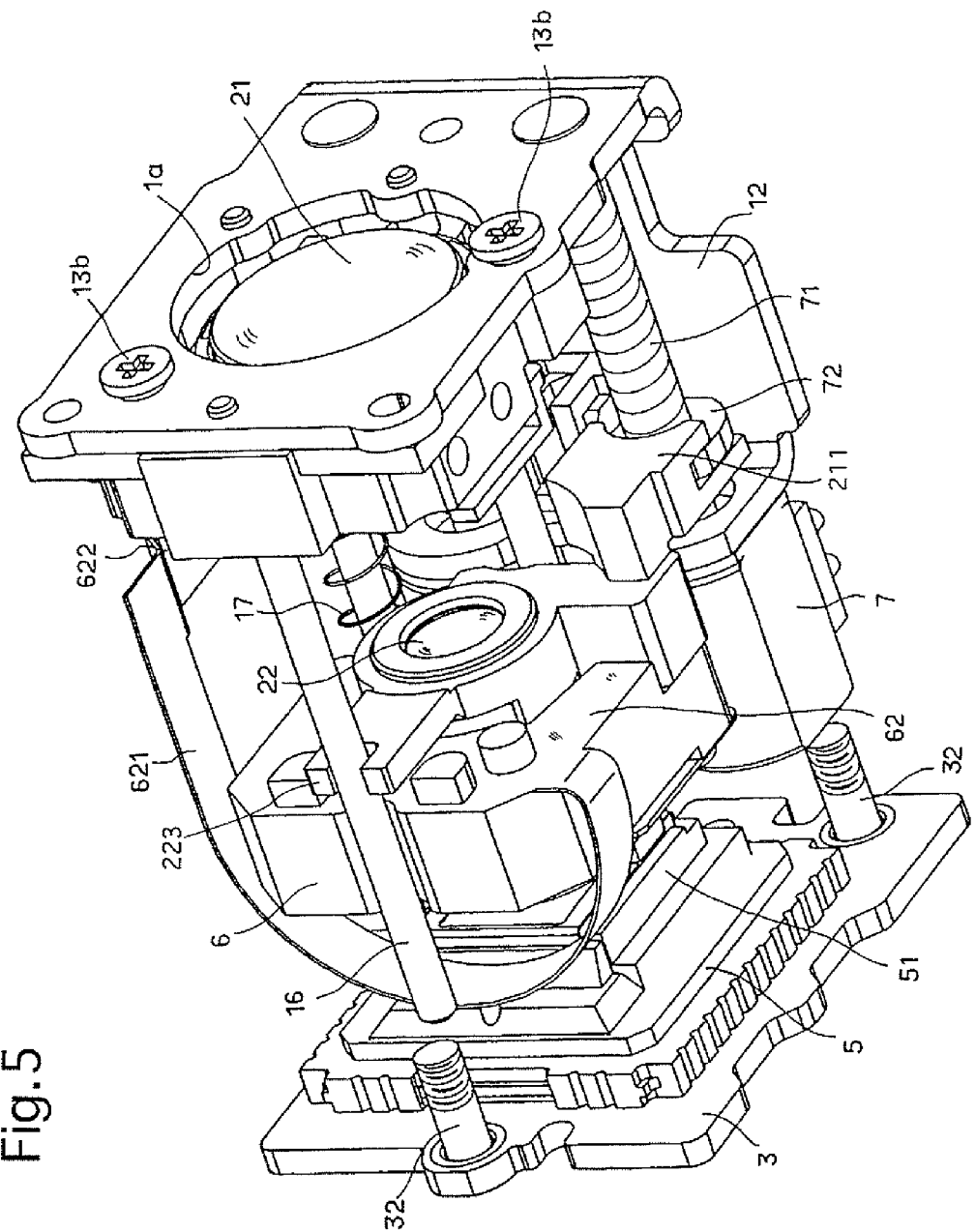
FIG. 5 is a bottom perspective view of the imaging device module from which a plastic housing portion is removed.

The first and second drive motors 7 and 8 and the two photo-interrupters 91 and 92 are electrically connected to the second circuit board 4 (see FIG. 1) that is provided on an outer surface of the housing 1. At the same time, the shutter unit 6 is electrically connected to the connecting terminal 43 of the second circuit board 4 via the flexible printed circuit board 62. FIG. 5 is a bottom perspective view of the imaging device module from which the plastic housing portion 11 is removed. The flexible printed circuit board 62 is provided integral with a surface of the shutter unit 6. A ribbon cable portion 621, which serves as a flexible PWB, extends from a bottom end of the flexible printed circuit board 62 to be positioned off-center from the optical axis of the lens system 2 (central axis of the housing 1) so as not to interfere with an optical path of the lens system 2. The ribbon cable portion (flexible PWB) 621 is bent in the vicinity of the end thereof which is connected to the shutter unit 6 so as to extend rearward (see FIG. 5) along a lower elongated opening (recess) 112 (see FIGS. 7A and 7B) that is formed in the bottom wall of the plastic housing portion 11 and elongated in the optical axis direction. Subsequently, the ribbon cable portion 621 is curved upwards so as to intersect a plane including the optical axis at a position behind the shutter unit 6. Hence, the ribbon cable portion 621 passes behind the shutter unit 6 and thereafter an end portion 622 of the ribbon cable portion 621 passes through the upper side of the shutter unit 6 so as to enter into an upper elongated opening (recess) 113 that is formed in the top wall of the plastic housing portion 11 and elongated in the optical axis direction. The end portion 622 is mechanically and electrically connected to the connecting terminal 43 of the second circuit board 4 via the upper elongated opening 113. A flat lid 114 having a smoothed (e.g., polished or glazed) inner surface is fixed to an outer surface of the bottom wall of the plastic housing portion 11 to close the lower elongated opening 112; and similarly, a flat lid 115 having a smoothed inner surface is fixed to an outer surface of the top wall of the plastic housing portion 11 to close the upper elongated opening 113.

Figure 6:
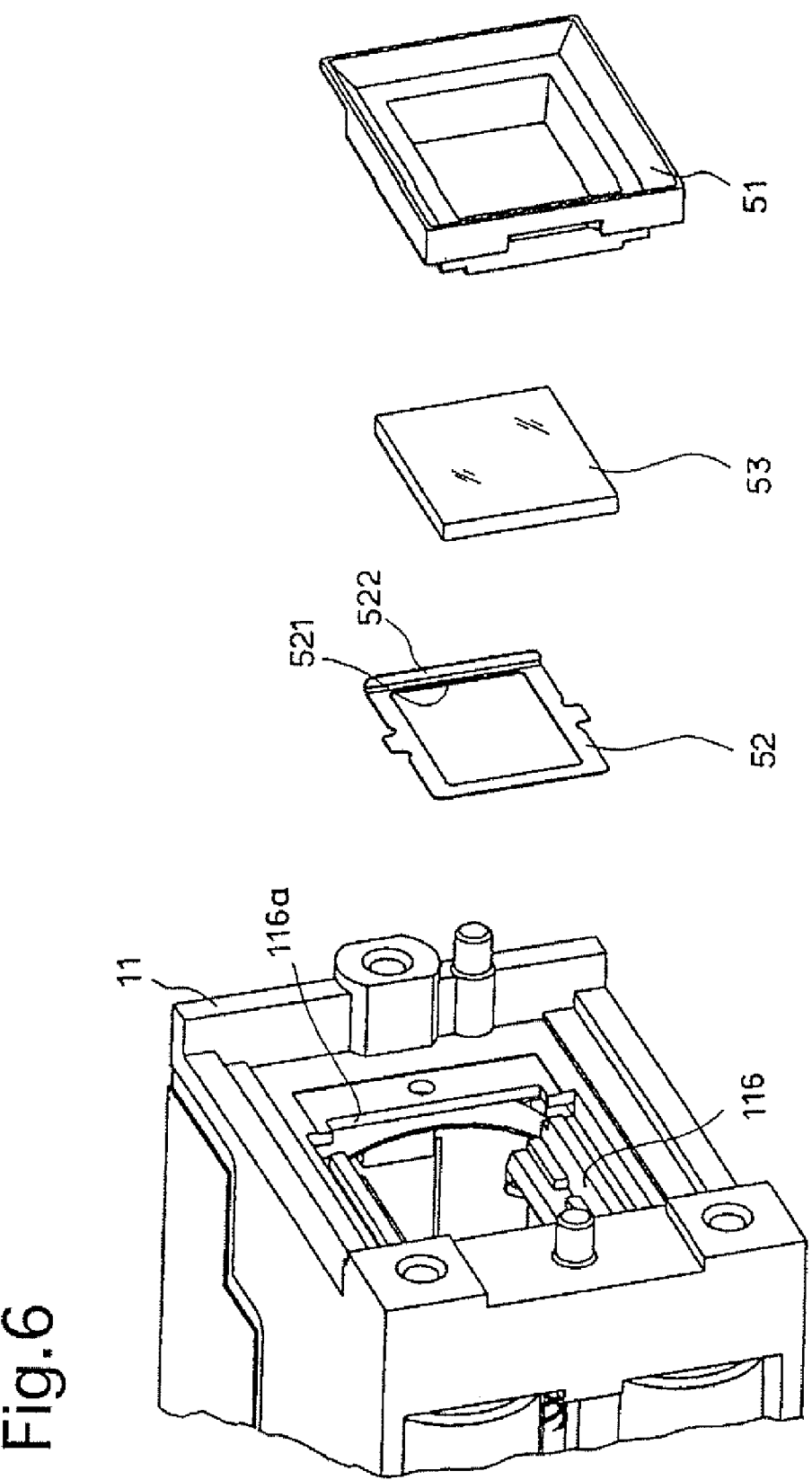
FIG. 6 is an exploded perspective view of a rear end portion of the imaging device module, viewed from the rear of the plastic housing portion.

As shown in an exploded perspective view of a rear end portion of the imaging device module shown in FIG. 6, viewed from the rear of the housing 1, the plastic housing portion 11 is provided at the rear end thereof with a rectangular photographing aperture frame 116. The lens system 2 is provided behind the second lens element 22 with a third lens element 23 (see FIG. 3). The third lens element 23 is fixed radially inside of the photographing aperture frame 116 so as to be positioned coaxially with respect to the first and second lens elements 21 and 22. The image pickup device 5 is positioned behind the photographing aperture frame 116 and the image pickup device 5 is mounted on the first circuit board 3 as shown in FIG. 1. The imaging device module is provided inside the photographing aperture frame 116 with a rectangular filter holding frame 51 which holds a low-pass filter 53. The filter holding frame 51 is made of rubber or elastic resin and fixed to the plastic housing portion 11. The lower-pass filter 53 is fixed to the filter holding frame 51 to be positioned between the third lens element 23 and the image pickup device 5 in a manner to be held between the filter holding frame 51 and a rectangular mask frame 52 which is made of metal and is fixed to the front end of the filter holding frame 51. The filter holding frame 51 also serves as a sealing member (packing) for sealing the space between the low-pass filter 53 and the image pickup device 5. The filter holding frame 51 presses the low-pass filter 53 forward against the mask frame 52 and thereafter the image pickup device 5 is mounted to the back of the filter holding frame 51. The image pickup device 5 is a package including an image pickup element (e.g., a CCD image sensor). The image pickup device 5 is fixed to the housing 1 by fixing the first circuit board 3 together with a reinforcing plate 31 to the plastic housing portion 11 by three set screws 32 (only two of them are shown in FIG. 5). A control circuit of a camera (not shown) incorporating the present embodiment of the imaging device module is electrically connected to the first circuit board 3.

As can be seen from the cross sectional view shown in FIG. 3, a portion of the photographing aperture frame 116, which faces the ribbon cable portion 621 of the flexible printed circuit board 62 that is connected to the shutter unit 6, is recessed in the direction of the thickness of the photographing aperture frame 116 (rightward as viewed in FIG. 3) to have a thin wall thickness, and accordingly, a side member 116a (see FIG. 6) of the photographing aperture frame 116 is formed to have a thin wall thickness in the optical axis direction. Although the mask frame 52 prevents light that travels outside the field of view (picture area) from passing through the low-pass filter 53, a side member 521 (see FIG. 6) of the mask frame 52 is positioned on the side member 116a therealong to also serve as a part of the photographing aperture frame 116. The side member 521 of the mask frame 52 is provided with a bent portion 522 which is formed by bending a part of the side member 521 at a substantially right angle in the direction of the thickness of the mask plate 52 along the direction of the length of the side member 521. The bent portion 522 is formed to serve as a stopper which is in contact with one side-edge of the low-pass filter 53.

Operations of the above illustrated embodiment of the imaging device module will be discussed hereinafter. Upon an object image being formed by the lens system 2 through the lens aperture 1a, the object image is focused on an imaging surface of the image pickup device 5 through the low-pass filter 53 and is photo-electrically converted into an electric signal to be output as an imaging signal via the first circuit board 3. When the object image is converted into an electric signal, the accumulating time (integral action time) for accumulating electric charges in the image pickup device 5 is controlled by controlling opening/shutting operations of the mechanical shutter in the shutter unit 6 by supplying an electrical signal to the shutter unit 6, which makes it possible to capture imaging signals. Additionally, upon the first and second drive motors 7 and 8 being driven to rotate the feed screws 71 and 81, respectively, the driven nuts 72 and 82 move in the optical axis direction, which cause the first lens element 21 and the second lens element 22 to move in the optical axis direction, respectively. A zooming operation can be carried out by changing the focal length of the lens system 2 by controlling positions of the first lens element 21 and the second lens element 22 in the optical axis direction by controlling operations of the first and second drive motors 7 and 8, respectively. Additionally, an autofocusing operation can be carried out at the same time. During zooming/focusing, predetermined specific positions of the first lens element 21 and the second lens element 22, i.e., the initial positions thereof, are detected by detecting the detecting pieces 212 and 611 at the photo-interrupters 91 and 92, which makes it possible to control positions of the first lens element 21 and the second lens element 22 with precision, i.e., allows precise magnifications for zooming and AF control.

Figure 7A:
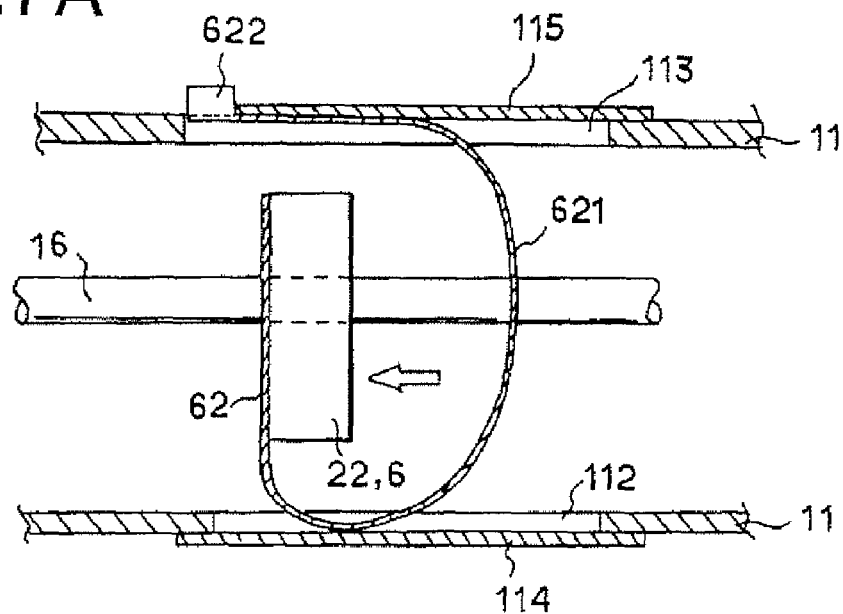
FIGS. 7A and 7B are schematic representations illustrating operations of the shutter unit and flexible PWB of the imaging device module.
Figure 7B:
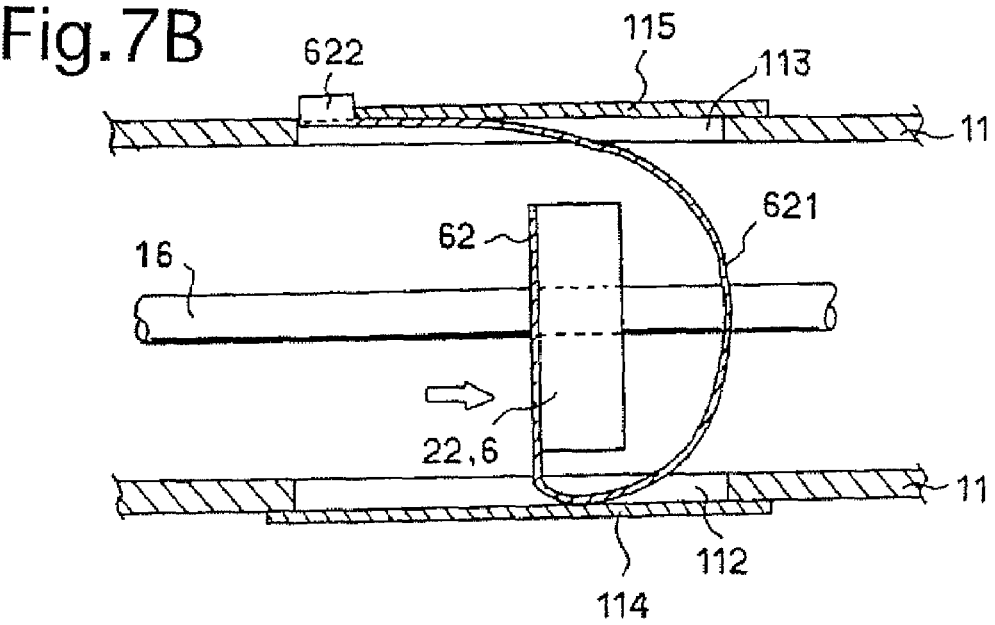

Moving the second lens element 22 in the optical axis direction causes the shutter unit 6 that is integral with the second lens element 22 to also move in the optical axis direction. Since the ribbon cable portion 621 of the flexible printed circuit board 62 is curved upwards from the flexible printed circuit board 62, at the bottom of the shutter unit 6, so that the flexible printed circuit board 62 intersects a plane including the optical axis at a position behind the shutter unit 6, the curved state of the ribbon cable portion 621 is maintained substantially at the same curvature even if the shutter unit 6 moves in the optical axis direction. Namely, the curvature of the curved portion of the ribbon cable portion 621 remains substantially the same even if the shutter unit 6 moves either forward as shown in FIG. 7A or rearward as shown in FIG. 7B in the optical axis direction. Therefore, the ribbon cable portion 621 is not sharply curved with an extremely small curvature; in other words, no portion of the ribbon cable portion 621 is folded, so that only a small force is required to bend the ribbon cable portion 621 (i.e., the flexible printed circuit board 62), and accordingly, only a small force is required to move the shutter unit 6 and the second lens element 22 in the optical axis direction. Consequently, loads on the second drive motor 8 that moves the shutter unit 6 and the second lens element 22 do not increase, which makes it possible to use a small-sized motor as the second drive motor 8, thus lowering power consumption.

In addition, the outer dimensions of the housing 1 do not increase because a recessed portion like the above described recessed portion disclosed in Japanese unexamined patent publication 2004-334101, in which an elastically deformed portion of the ribbon cable portion 621 of the flexible printed circuit board 62 can be accommodated, does not need to be provided on a side surface of the housing 1. Moreover, although the ribbon cable portion 621 is curved outward to partly come in contact with inner surfaces of the upper and lower walls of the plastic housing portion 11 when the shutter unit 6 and the second lens element 22 move forward and rearward, the ribbon cable portion 621 is in sliding contact with the smoothed inner surfaces of the flat lids 114 and 115 in the lower elongated opening 112 and the upper elongated opening 113, respectively, and therefore, the friction resistance between the ribbon cable portion 621 and the inner surface of the housing 1 is small. Accordingly, the ribbon cable portion 621 can be elastically deformed smoothly while the circuit pattern printed on the flexible printed circuit board 62 and the ribbon cable portion 621 thereof is not damaged by friction, and the like. Furthermore, although the ribbon cable portion 621 comes close to an inner surface of the rear end wall of the plastic housing portion 11 in the optical axis direction when the shutter unit 6 and the second lens element 22 move rearward, the side member 116a of the photographing aperture frame 116 is formed to have a thin wall thickness so that the ribbon cable portion 621 does not interfere with an inner surface of the plastic housing portion 11, which makes it easy for the ribbon cable portion 621 to be elastically deformed.

Although the side member 116a of the photographing aperture frame 116 that is provided at the rear end of the plastic housing portion 11 is formed to have a thin wall thickness as described above, the side member 521 of the mask frame 52 is also provided along the side member 116a, which makes it possible to configure the photographing aperture frame 116 so that the low-pass filter 53 can be properly fixed to the photographing aperture frame 116. Additionally, providing the side member 521 with the bent portion 522 that serves as a stopper for the low-pass filter 53 increases the mechanical strength of the mask frame 52, thus making it possible to fix the low-pass filter 53 with stability and further making it possible to fix the filter holding frame 51 and the image pickup device 5, which are laid on the back of the low-pass filter 53, to the plastic housing portion 11 with a high degree of reliability.

In the above illustrated embodiment of the imaging device module, the housing 1 consists of the plastic housing portion 11 and the metal housing portion 12, specifically four of the six outer walls of the box-shaped housing 1 are respectively formed from the four walls of the plastic housing portion 11 which is made of resin. This hybrid structure is advantageous for reducing weight and production cost of the imaging device module. On the other hand, the necessary strength for the housing 1 is achieved because a portion of the housing 1 which is required to have certain strength for the fixation of the first and second drive motors 7 and 8 to the housing 1 is made as the metal housing portion 12. Moreover, when the metal housing portion 12 is fixed to the plastic housing portion 11 by the set screws 13a and 13b, the alloy-made stationary seat member 14 is fixed to the plastic housing portion 11 by the set screws 13a beforehand and thereafter the metal housing portion 12 is fixed to the stationary seat member 14 by the set screws 13b. This fixing structure makes it possible to secure a sufficient screw-fixing strength relative to the plastic housing portion 11 even if a large load is applied to the metal housing portion 12.

Although the ribbon cable portion 621 of the flexible printed circuit board 62 that is connected to the shutter unit 6 is curved to extend substantially vertically behind the shutter unit 6 in the above illustrated embodiment of the imaging device module, it is possible that the ribbon cable portion 621 be curved to extend substantially vertically in front of the shutter unit 6 if a point of connection of the end portion 622 of the ribbon cable portion 621 to the housing 1 is different from that in the above illustrated embodiment of the imaging device module. Alternatively, it is possible that the ribbon cable portion 621 be curved to extend substantially horizontally if necessary.

Although the above illustrated embodiment of the imaging device module is of a type which includes a zooming function wherein the first and second lens elements 21 and 22 are moved in the optical axis direction to perform a zooming operation, the present invention can also be applied to another type of imaging device module in which a shutter unit that is to be electrically connected to an electrical circuit or the like is moved either independently or together with one or more lens elements.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. An imaging device module comprising:
    a housing; and
    a lens system, an image pickup device, a shutter unit, an external circuit board and a flexible printed wiring board which are provided with said housing, said image pickup device being positioned behind said shutter unit in an optical axis direction;
    wherein said shutter unit is movable in an said optical axis direction,
    said external circuit board is provided outside of said housing,
    one end of said flexible printed wiring board is electrically connected to said shutter unit, another end of said flexible printed wiring board is electrically connected to said external circuit board, said flexible printed wiring board is curved so as to intersect a plane including said optical axis, and
    said flexible printed wiring board extends behind said shutter unit, crosses over said optical axis, and connects to said external circuit board in front of said shutter unit.

2. The imaging device module according to claim 1, wherein said flexible printed wiring board is in the shape of a strip.

3. The imaging device module according to claim 1, wherein said housing comprises a photographing aperture frame provided on a wall of said housing to which said image pickup device is mounted,
    wherein a portion of said photographing aperture frame, which faces said flexible printed wiring board, is recessed in a direction of thickness of said photographing aperture frame to have a thin wall thickness which is thinner than said thickness of said photographing aperture frame, and
    wherein an optical filter for said image pickup device is fixed to said photographing aperture frame via a mask frame.

4. The imaging device module according to claim 3, wherein said mask frame comprises a bent portion which is formed so as to correspond to said recessed portion of said photographing aperture frame.

5. The imaging device module according to claim 1, wherein at least one opening is formed on a side of said housing into which said flexible printed wiring board partly enters, and
   wherein at least one lid having a smoothed inner surface is fixed to said housing so as to cover said opening on an outer side of said housing.

6. The imaging device module according to claim 1, further comprising at least one motor for driving at least one lens element,
   wherein said housing includes a plastic housing portion molded out of resin and a metal housing portion, said motor being fixed to said metal housing portion.

7. The imaging device module according to claim 6, wherein two of said lens elements are driven in said optical axis direction in said housing, and
   wherein two motors for driving said two lens elements in said optical axis direction, respectively, are fixed to said metal housing portion to be arranged side by side.

8. The imaging device module according to claim 6, further comprising a stationary seat member made of metal which is fixed to said plastic housing portion,
   wherein said metal housing portion is fixed to said stationary seat member by at least one set screw.

9. The imaging device module according to claim 8, wherein said stationary seat member is fixed to said plastic housing portion by at least one other set screw.

10. The imaging device module according to claim 1, further comprising a plurality of parallel guide shafts provided in said housing for guiding a lens element and said shutter unit in said optical axis direction.

11. The imaging device module according to claim 3, wherein said portion of said photographing aperture frame is recessed rearward, toward said image pickup device, to prevent said flexible printed wiring board from interfering with said photographing aperture frame.

12. The imaging device according to claim 3, wherein said optical filter comprises a low-pass filter.

13. The imaging device module according to claim 5, wherein said opening is elongated in said optical axis direction.

14. The imaging device module according to claim 7, wherein said two lens elements are driven in said optical axis direction to perform at least one of a zooming operation and a focusing operation.

15. An imaging device module comprising:
   a housing;
   a lens system, an image pickup device, and a shutter unit, which are accommodated in said housing, said image pickup device being positioned behind said shutter unit in an optical axis direction; and
   a flexible printed wiring board which extends from said shutter unit so that an end portion of said flexible printed wiring board is connected to an external circuit board positioned outside of said housing,
   wherein said lens system includes at least one lens element which is integrally moved with said shutter unit in said optical axis direction,
   said flexible printed wiring board extends from said shutter unit to said external circuit board so that a part of said flexible printed wiring board is curved so as to intersect a plane including said optical axis, and
   said flexible printed wiring board extends behind said shutter unit, crosses over said optical axis, and connects to said external circuit board in front of said shutter unit.

* * * * *